United States Patent
Tyves et al.

(10) Patent No.: US 6,186,653 B1
(45) Date of Patent: Feb. 13, 2001

(54) DOOR MOUNTED COURTESY LIGHT FIXTURE AND ASSEMBLY

(75) Inventors: Zinovy Tyves, Windsor (CA); Joseph Frank Carnaghi, Macomb; Gordon Leroy Cook, Flint, both of MI (US)

(73) Assignee: Delphi Technologies, Inc., Troy, MI (US)

( * ) Notice: Under 35 U.S.C. 154(b), the term of this patent shall be extended for 0 days.

(21) Appl. No.: 09/314,087

(22) Filed: May 18, 1999

(51) Int. Cl.[7] ................................................. F21W 101/02
(52) U.S. Cl. ........................... 362/549; 362/501; 362/457
(58) Field of Search .................... 362/501, 549, 362/396, 457

(56) References Cited

U.S. PATENT DOCUMENTS

| | | | |
|---|---|---|---|
| 3,814,928 | * | 6/1974 | Grosseau ................................ 362/549 |
| 5,566,057 | * | 10/1996 | Iwami .................................... 362/549 |
| 5,651,604 | * | 7/1997 | Dobler et al. ..................... 362/549 X |

* cited by examiner

*Primary Examiner*—Laura K. Tso
(74) *Attorney, Agent, or Firm*—Patrick M. Griffin

(57) ABSTRACT

A courtesy light fixture for an automotive vehicle includes a housing having a base, a header wall and a supporting portion connecting the header wall to the base. The base includes a plurality of resilient clips which snap onto a support member of a door module. Resilient fingers of the base bear against the support member and urge the base inward to seat the clips against the support. The header wall mounts a lamp receptacle. A seal surrounding the receptacle engages a flange of a lens assembly on a trim panel of the door module so that a lamp in the receptacle is held in a fixed relation with the lens assembly for best illumination of the lighted area. The lens assembly is removable from the trim panel for changing the lamp without removing the trim panel from the door. The resilient fingers yield to take up variations between the trim panel location and the door module support member so the seal always engages the lens housing and flange to maintain the desired lamp position and prevent entry of contaminants or water into the lamp location.

15 Claims, 4 Drawing Sheets

DOOR MOUNTED COURTESY LIGHT FIXTURE AND ASSEMBLY

TECHNICAL FIELD

This invention relates to courtesy light fixtures for automotive vehicles and, more particularly, to a door mounted courtesy light fixture and door assembly with novel features.

BACKGROUND OF THE INVENTION

It is known in the art relating to automotive vehicles to provide courtesy lights for lighting the interior, and sometimes the exterior entryway adjacent the vehicle doors, to aid in entering and leaving the vehicle under nighttime conditions or where exterior illumination is not available. Such courtesy lights are sometimes mounted on the interior of the vehicle door for lighting either the front or rear seat entryways or both.

Typically, the light fixture is mounted in a housing attached to the backside of an interior trim panel and connected with wiring provided on the associated door module and installed at the time of assembly of the trim panel to the door, for example, during vehicle assembly. Because of the positioning of the fixture behind a panel opening, it is sometimes necessary to remove the trim panel in order to replace a burned out electric lightbulb. Also, in some cases, variations in the distance between the lightbulb and the interior lens, due to tolerances between the door and trim panel, cause the amount of illumination be reduced from that desired and available when the lamp is properly located relative to the lens.

SUMMARY OF THE INVENTION

The present invention provides novel courtesy light fixture and door assemblies which together overcome many of the problems of prior art courtesy light fixture arrangements.

A feature of the invention is provision of a housing including a base that is snap attached to a support member of an associated door module or panel. The housing further includes a tubular connecting portion extending laterally from the base to a header wall formed on an inner end of the tubular connecting portion. A lamp receptacle including a lamp socket and associated conductors is centrally mounted on the header wall for receiving an electric lamp or lightbulb of any suitable type. A rubber seal is mounted around the lamp receptacle to enclose and protect the lamp and socket against entry of contaminants and water. Electrical conductors lead to a connector for connecting the lamp receptacle with electrical wiring provided on the associated door module at the time of installation of the light fixture housing onto the door module. Thus, all electrical portions of the assembly are completed upon buildup of the door module prior to installation of a trim panel on the door.

An associated interior trim panel for mounting on the inner side of the door may be provided with a lens housing mounted on or integrally formed in the trim panel and having a recessed portion with an outer wall that engages the rubber seal of the light fixture housing upon installation of the trim panel to the vehicle door. A lens assembly is removably secured to the lens housing in the trim panel by any suitable means, for example, by a tab at one end of an extended decorative body engaging a slot for retaining one end of the lens assembly which is then pivoted into position and retained by a snap fastener captured by the lens body to avoid loss. The lens assembly includes a central light transmitting lens portion with a light guide extending from the central portion to an inner flange which also engages the seal of the light fixture housing upon installation of the trim panel to the door.

The light fixture housing and trim panel mounting are such as to provide an interference fit of the assembly which assures contact of the lens flange and housing surfaces with the rubber seal of the housing and urges the housing toward the support member on which it is mounted. Resilient fingers are provided in the side mounting base of the light fixture housing which provide a resilient connection allowing the housing position to be adjusted by contact with the trim panel so that the rubber seal is continuously urged inward against the light guide flange and the outer wall of the lens housing in spite of variations in the tolerances of the components making up the door module and trim panel assembly or variations in trim panel location occasioned by various conditions during the service life of the vehicle.

These and other features and advantages of the invention will be more fully understood from the following description of certain specific embodiments of the invention taken together with the accompanying drawings.

DESCRIPTION OF THE PREFERRED EMBODIMENT

Figure 1:
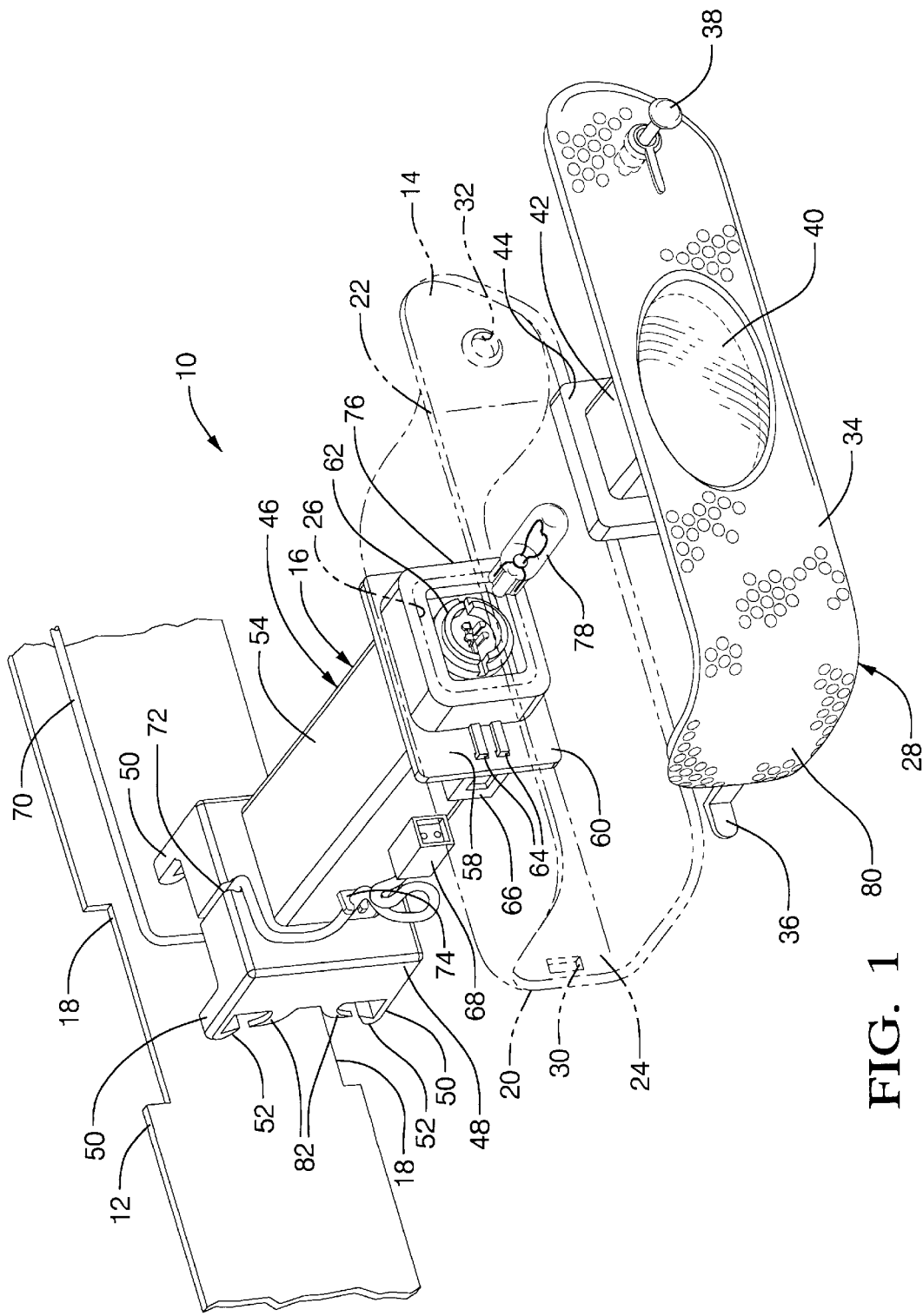
FIG. 1 is an exploded pictorial view illustrating the construction and mounting of a courtesy light fixture to an associated door module support member and interior trim panel including a removable lens assembly.
Figure 2:
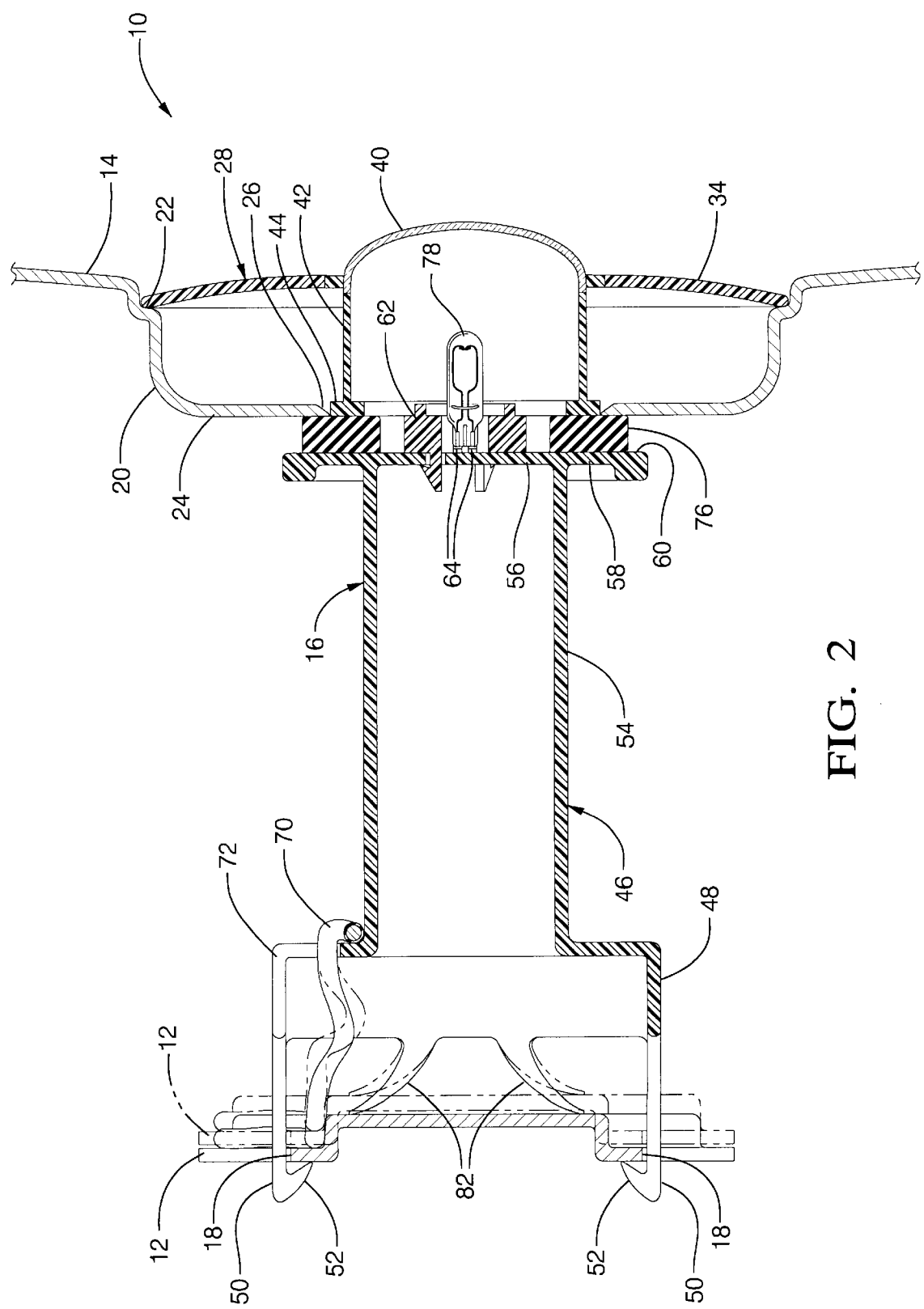
FIG. 2 is a cross-sectional view taken vertically through the completed door assembly.

Referring now to FIGS. 1 and 2 of the drawings in detail, numeral 10 generally indicates a vehicle door assembly including a door module having a support member 12, an interior trim panel 14, and a courtesy light fixture 16 mounted between the support 12 and panel 14. The support member 12 is an elongated member of metal, or other suitable material, having edge recesses 18 adapted for receiving resilient clips to be subsequently described. However, the member 12 could also be formed as a panel having slots suitably placed for receiving the clips. Alternatively, the support member could take any other suitable configuration adapted for mounting the light fixture 16.

The trim panel 14 is illustrated as a molded panel member having a recessed lens housing 20 molded integrally with the panel 14. Alternatively, the lens housing could be formed as a separate member attached to the trim panel by any suitable means. The lens housing may include a peripheral lip 22 and a recessed outer wall 24. The outer wall 24 includes a central opening 26 and the lip 22 defines a mounting surface surrounding the open inner edge of the recess on which an associated lens assembly 28 is mounted.

In the illustrated embodiment, the courtesy light fixture 16 is located adjacent the rear edge of an associated vehicle door so that the lens housing 20 forms a longitudinally extending recess which is open toward its rear end at an interior edge of the door assembly 10. The lens housing 20 includes a slot 30 located at the end of the outer wall 24 and a snap receiving opening 32 formed in the trim panel 14 adjacent the opposite end of the lens housing 20. Lens assembly 28 is formed with a longitudinally extended decorative body 34 having a curved outer end terminating in an angle clip 36 that is receivable within the slot 30 for installation of the lens assembly on the lens housing 20. A captured snap fastener 38 is provided at the forward end of the body 34 for snap fitting into the opening 32 in order to retain the lens assembly 28 in position on the lens housing 20 with the edges of the body 34 engaging the lip 22 on the lens housing.

Centrally, the lens assembly includes a light transmitting lens 40 which connects laterally outwardly (relative to the interior of the door assembly) with a light retaining light guide 42. The light guide terminates outwardly in a flange 44 which, in assembly, is generally aligned with the central opening 26 of outer wall 24 of the lens housing and extends within and adjacent the edges of the central opening 26 in the outer wall 24.

The courtesy light fixture 16 preferably includes a molded plastic housing 46 having a base 48, which may be rectangular, and includes a plurality of, in this case four, resilient clips 50 having prongs 52. The prongs 52 are adapted to snap over the edges of the recesses 18 of the support member 12 so as to hold the base 48 in position on the door module support member 12 prior to final assembly.

A tubular connecting portion 54 extends laterally inwardly, relative to the vehicle door from the base 48 to a header wall 56 including a vertically extending flange 58, forming together a generally flat mounting surface 60. A conventional lamp receptacle 62 of any suitable type is snap fitted, or otherwise attached, onto a central portion of the header wall 56. Electrical conductors 64 extend from the lamp receptacle 62 through the flange 58 to an electrical connector 66 mounted on the opposite or outside of the flange 58. Connector 66 is connectable with a mating connector 68 that is connected with wiring 70 mounted on the door module support member 12. The wiring extends through a support slot 72 in the housing base 48 and an associated clip 74 to feed electrical power to the lamp receptacle 62 when the assembly is installed on the door module support member 12.

At the inner end of the light fixture 16, a rubber or other form of seal 76 is mounted on surface 60 of the header wall, surrounding the lamp receptacle 62. In assembly, the seal 76 engages both the edges of the outer wall 24 of the lens housing 20 adjacent the central opening 26 and the flange 44 of the light guide 42. The flange 44 extends flush with the outer wall 24 inside the central opening 26. The seal thereby prevents the entry of contaminants and water from inside the door assembly as well as through the recess formed by the lens housing 20 in the interior door panel. An electrical lightbulb or lamp 78 is seated in the lamp receptacle 62 and extends within the light guide 42 in position relative to the lens 40 for properly illuminating the entry portion adjacent the rear end of the front door on which the courtesy lamp is mounted. The curved rear portion 80 of the decorative body 34 of the lens assembly 28 is preferably formed as a reflector to indicate to the drivers of on-coming vehicles the open position of the vehicle door.

It is recognized that design and assembly tolerances in the construction of the vehicle door module and associated panels, including the interior trim panel 14, must be accounted for in order to maintain engagement of the seal 76 with the wall 24 and flange 44 as required to prevent entry of water and other contaminants into the light guide chamber within which the lamp 78 is located. FIG. 2 illustrates in solid lines the relative position of the support member 12 at the limit of its dimensional tolerance or spacing from the inner wall 24 of trim panel 14. In most instances, the relative distance will be less than the maximum indicated by the solid lines. Dashed lines 12 indicate a relative position of the support member 12 at a minimum distance from the lens housing inner wall 24. The light fixture housing 24 accommodates these differences by the provision of resilient fingers 82. These engage the support member 12 at all times to urge the housing seal 76 inwardly against the outer wall 24 and flange 44 under all dimensional conditions within the design and manufacturing tolerances existing in the assembly.

Thus, in all conditions, the prongs 52 of clips 50 will hold the light fixture 16 in position on the support member 12 prior to installation of the trim panel 14. In most cases, installation of the trim panel 14 will then force the housing 46 outwardly, deforming the spring fingers 82 which maintain the seal 76 in its intended position. The prongs 52 of clips 50 are then forced outward, away from the surface of support member 12, but the clips 50 continue to align the base on the support member 12.

Figure 3:
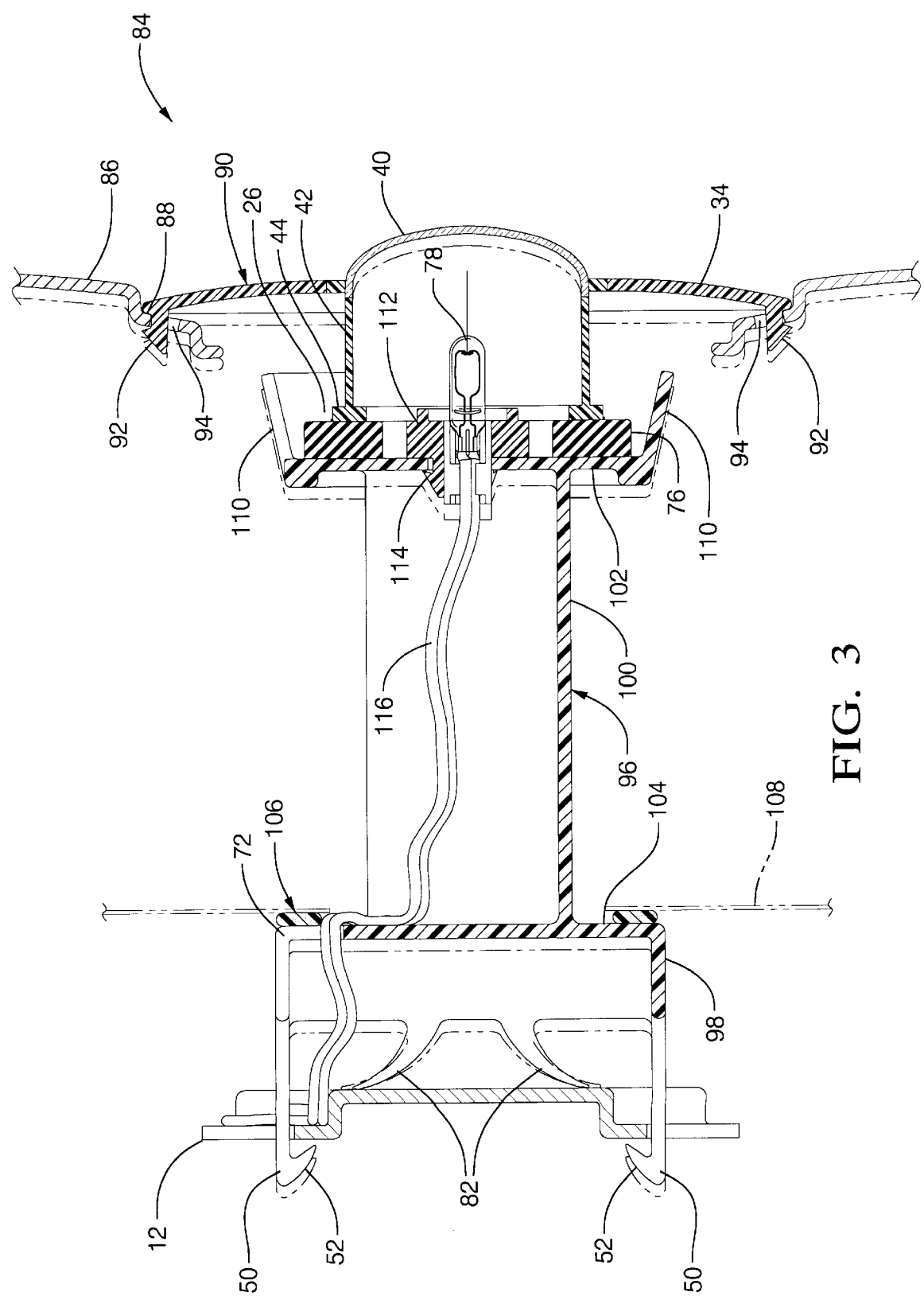
FIG. 3 is a cross-sectional view similar to FIG. 2 of a modified embodiment of courtesy light fixture and door assembly according to the invention.
Figure 4:
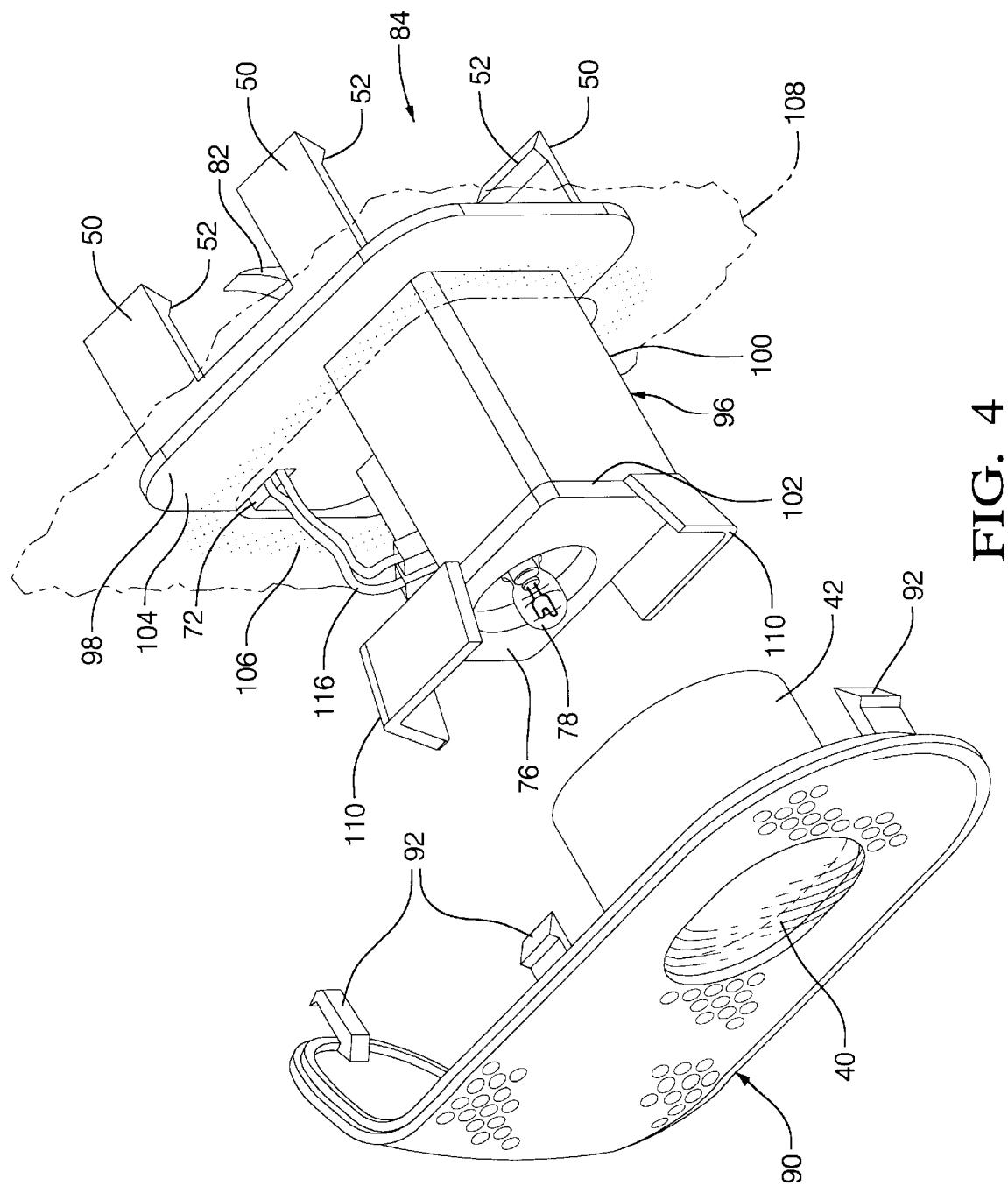
FIG. 4 is an exploded pictorial view of the door assembly of FIG. 3.

FIGS. 3 and 4 illustrate an alternative embodiment of courtesy light fixture and door assembly which accomplishes the foregoing and other purposes of the invention in a somewhat different manner. Numeral 84 indicates a door and courtesy light fixture assembly similar to assembly 10 and wherein like numerals indicate like parts. Assembly 84 includes the support member 12, and a modified trim panel 86 which omits the lens housing 20 of the previous panel. Instead, panel 86 is cut out inside the lip 88 provided to receive a lens assembly 90. The lens assembly is also modified by being made shorter on the end forward of the lens 40 and provided with pronged fingers 92 which snap into slots 94 in the trim panel to retain the lens assembly 90 in place. The light guide 42 and flange 44 are essentially unchanged.

A modified light fixture housing 96 is also provided with a base 98, connecting portion 100 and header wall 102. The base 98 is shorter laterally but includes resilient clips 50 with prongs 52 and spring fingers 82 as before for engaging the door support member 12. Base 98 includes a vertical wall 104 as before which receives in assembly a butyl adhesive sealer 106 engaging a plastic water deflector sheet 108 conventionally mounted inside the door assembly to prevent water entering the door from reaching the trim panel 86 or entering the vehicle passenger compartment. This feature could also be applied in the door assembly 10, although not previously mentioned.

The connecting portion 100 is modified to an L shaped member open on two sides instead of the previous tubular form. The header wall 102 is supported on the inner end of portion 100 and includes a seal 76 as before for engagement by flange 44 of the lens assembly 90. Outwardly angled L-shaped housing guides 110 extend laterally inward from opposite corners of the header wall 102 to assist in guiding the light guide 42 and flange 44 of the lens assembly 90 and the associated trim panel 86 into their proper positions during assembly of the trim panel and lens assembly onto the door to complete the door assembly 84. The lamp 78 is received in a different but conventional lamp receptacle 112 which is installed on the header wall 102 by an insert and twist coupling 114 and includes an attached wiring harness 116 that is threaded through a slot 72 in the base for mounting on the support member 12 or other portion of the door assembly as before.

Dashed lines in FIG. 3 indicate variations in the position of the trim panel 86, the attached lens assembly 90 and the connected light fixture housing 96 which occur not only due to manufacturing and assembly tolerances but also to temperature variations, aging and other factors affecting the shape of the trim panel during its service life. These changes are accommodated, as in the previously described embodiment, by the spring fingers 82 which bias the light fixture housing inward away from the support 12 and maintain contact of the seal 76 against flange 44 of the lens assembly under all conditions.

The embodiments described above thus provide the following advantages over conventional door mounted courtesy light assemblies. 1) The electric lamp, receptacle and all of the associated wiring are mounted with the housing on the support member 12 and are completely separated from connection with the associated trim panel. 2) Resilient spring fingers in the base of the light fixture housing maintain contact of the seal with the flange 44 of the light guide (and the outer wall of the lens housing in door assembly 10) after installation of the inner trim panel. The seal 76 thus prevents entry of contaminants into the lamp chamber under all of the varying tolerance conditions anticipated in design and manufacture of the door assembly as well as due to moving of the trim panel due to temperature changes, aging, and other changes which may occur. 3) The lens assembly 28 is removable by release of the captured snap fastener 38 or the pronged fingers 92 so as to provide access for replacement of the lamp 78 without requiring removal of the trim panel from the door.

These features provide an arrangement where all of the electrical assembly and mounting of the light fixture housing may be accomplished in assembly of the door module before the inner trim panel is mounted on the door during vehicle assembly. The arrangement reduces the cost of the door assembly, in that electrical connections are not required to be made at the time of vehicle assembly but are all completed in the door module assembly, when access to the electrical connections is more easily obtained and thus less costly to complete. This advantage is gained while retaining the capability of replacing the electric lamp by merely removing the internal lens assembly without requiring removal or adjustment of the trim panel.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

What is claimed is:

1. A courtesy light fixture for an automotive vehicle, said fixture comprising:

a housing including a side mounting base, a header wall spaced laterally inward from the base, and a connecting portion connecting the header wall to the base;

the base including a plurality of resilient clips adapted to snap onto an outer support member of a door module and resilient fingers adapted to bear against the support member and urge the base inward to seat the clips against the support; and the header wall mounting a lamp receptacle, and a seal surrounding the receptacle and having an inner surface engagable with a lens assembly mounted separately on an associated interior trim panel mounted on the door module.

2. A courtesy light fixture as in claim 1 wherein said housing is an integral molding.

3. A courtesy light fixture as in claim 2 wherein said base is rectangular, having four corners adjacent which the resilient clips extend, the resilient fingers being located adjacent the clips.

4. A courtesy light fixture as in claim 2 wherein the connecting portion is tubular.

5. A courtesy light fixture as in claim 2 wherein the connecting portion forms an open sided enclosure.

6. A courtesy light fixture as in claim 2 wherein said header wall includes laterally inwardly projecting guides for aiding positioning of a lens assembly and trim panel for installation in a door assembly.

7. A vehicle door assembly comprising:

a courtesy light fixture as in claim 1;

a door module including an outer support member, said light fixture being clipped to the support member and extending laterally inward therefrom with the header wall located toward an inner side of the door module; and electrical wiring connected with said lamp receptacle of the light fixture and supported by the door module for connection with a power source.

8. A vehicle door assembly as in claim 7 and further comprising:

a trim panel mounted on the inner side of the door module and including an opening generally aligned with said receptacle, an electrical lamp mounted in said receptacle and extending toward said opening, and a lens removably secured to said trim panel and covering the lamp for protecting the lamp in use while allowing access for replacement without removing the trim panel.

9. A vehicle door assembly as in claim 8 wherein said lens includes a light transmitting portion and a light guide surrounding the lamp and extending to the light transmitting portion, the light guide including an inner flange engaging said seal.

10. A vehicle door assembly as in claim 9 wherein said trim panel and lens are positioned in assembly such that the light guide inner flange forces the fixture housing outward, resiliently deforming the resilient fingers which maintain a force continuously urging the fixture housing inward and holding said seal against said flange and maintaining a fixed position of the lamp relative to the lens regardless of variations in the spacing of the flange from the support member.

11. A vehicle door assembly as in claim 9 and including housing guides extending inward from said header wall for guiding the flange and light guide toward the seal during assembly of said lens to the door assembly.

12. A vehicle door assembly as in claim 9 wherein said lens further includes a decorative portion extending longitudinally to at least one end on one side of the light transmitting portion, and fastener means removably securing the lens to the trim panel.

13. A vehicle door assembly as in claim 12 wherein said fastener means includes a mounting clip located on one of said ends and engagable with a slot in said trim panel and a fastener located adjacent another of said ends and removably engagable with a fastener receiving opening in the trim panel.

14. A vehicle door assembly as in claim 13 wherein said fastener is a snap retainer element captured in said lens and said fastener receiving opening is configured for snap retention of said fastener when inserted therein.

15. A vehicle door assembly as in claim 12 wherein said fastener means comprise fingers removably engagable with slots in the trim panel.

* * * * *